United States Patent
Lee et al.

(10) Patent No.: US 8,453,053 B2
(45) Date of Patent: May 28, 2013

(54) RAPID SOFTWARE REPORT DEVELOPMENT TOOL WITH AUTO DATABASE HANDLING AND MENU TOOL-BAR PLUG-IN FOR APPLICATION REPORT ACCESS

(75) Inventors: Kwee Hui Lee, Selangor (MY); Foot Yow Wong, Negeri Sembilan (MY); Kin Hoon Wong, Selangor (MY); Kok Peng Lee, Selangor (MY)

(73) Assignee: ECAVA Sdn. Bhd., Kuala Lumpur (MY)

( * ) Notice: Subject to any disclaimer, the term of this patent is extended or adjusted under 35 U.S.C. 154(b) by 541 days.

(21) Appl. No.: 12/399,238

(22) Filed: Mar. 6, 2009

(65) Prior Publication Data
US 2010/0229084 A1 Sep. 9, 2010

(51) Int. Cl.
*G06F 17/30* (2006.01)

(52) U.S. Cl.
USPC ............................ 715/271; 715/249; 707/603

(58) Field of Classification Search
USPC ................................ 715/271, 249; 707/603
See application file for complete search history.

(56) References Cited

U.S. PATENT DOCUMENTS

| | | | |
|---|---|---|---|
| 7,581,189 B2 * | 8/2009 | Woodall et al. | 715/762 |
| 2007/0067711 A1 * | 3/2007 | Woodall et al. | 715/505 |
| 2007/0088689 A1 * | 4/2007 | Cras et al. | 707/4 |
| 2008/0091709 A1 * | 4/2008 | Chang et al. | 707/102 |

OTHER PUBLICATIONS

Brian Larson, Microsoft SQL Server 2005 Reporting Services, 74 pages provided (McGraw-Hill, 2005).*
CitectSCADA, Citect HMI "User Guide" Chapter 15: Reporting Information pp. 363-372 2004 Citect Corporation, Citect Pty. Limited, 3 Fitzsimons Lane, P.O. Box 174 Pymble NSW 2073, Australia.
Factorylink 6.6.0/Configuration Guide Sep. 1998, Chapters 33-35, pp. 549-572.

* cited by examiner

*Primary Examiner* — Doug Hutton, Jr.
*Assistant Examiner* — Scott M Kelly
(74) *Attorney, Agent, or Firm* — Volpe and Koenig, P.C.

(57) ABSTRACT

A method is provided for generating reports for a computer monitored or aided environment that has a server-side module, a client-side module and a database, the server-side module, client-side module and database being interconnected, The method includes creating a report layout, the report layout containing a predefined number of dynamic fields at predetermined positions; associating, at the server-side, each dynamic field with a data source; collecting, at the server-side, information for each dynamic field according to the associated data source; storing the information in the database; and displaying the information for each dynamic field on a display according to the report layout. The report layout is shared universally for the generation of a displayed report and a printed report.

18 Claims, 16 Drawing Sheets

| Conventional Reporting System | New System |
|---|---|
| Create one report layout for report printout. | Create one report layout which can be used for both screen viewing and report printout. |
| Associate data field for printout with data source. | Associate data field with data source. |
| Create mechanism to save and restore data from database. For instance, using SQL statement or store into common flat files. | Automatically created. |
| Set auto logging rate. For instance, hourly, daily or weekly. | Set auto logging rate. For instance, hourly, daily or weekly. |
| Create one report screen for live/online viewing. | Not required. |
| Associate data field for screen with data source. | Not required. |
| Produce User Interface for end user to open and save report data. | Automatically plug-in. |

Fig. 1A

| No | Conventional Reporting | New System |
|----|------------------------|------------|
| 1. | SI Engineer creates Tag and link to data source or prepare logic to calculate its data. | SI Engineer creates Tag and link to data source or prepare logic to calculate its data. |
| 2. | SI Engineer creates report layout or format, add in Tags. | SI Engineer creates report layout or format, add in Tags. |
| 3. | SI Engineer specifies the logging rate for archiving. | SI Engineer specifies the logging rate for archiving. |
| 4. | SI Engineer enters the tag(s) from the layout for archiving. | Result: Layout is ready for printing. Server Report module automatically lookup the tag(s) from layout, fetch its live value and archive it according to time specified by SI Engineer. |
| 5. | Result: Report module shall automatically archive the data based on entered tags according to the specified logging rate, but regardless of what have been specified in the Tag link of the layout. Careless mistake may occur here. Meaning tags in the layout may be different from tags in archive entry. | Result: The same layout also can be placed on screen. Client Report module automatically insert report tool-bar onto the layout for screen viewing. The built-in report tool-bar shall provides features for operator to do manual archiving, opening archive, print etc. Operator shall be able to view dynamic live data or archived fixed data by navigating via the report tool-bar. |
| 6. | SI Engineer creates another same report layout for screen viewing, add in Tags, if no external reporting tool is used. | |
| 7. | Result: Client viewing screen can show screen viewing for either live data or fixed data, not both, unless put additional effort to program. No built-in tool-bar, so no facilities to open archived data and additional programming work is needed. If no additional reporting tool is used, careless mistake may occur here, because the layout is created separately, and the tags are link for one more time in different interface. So the outcome can be such that the printed report is different from what shown on the screen. | |

Fig. 1B

Manual and Automated Report Archiving Architecture

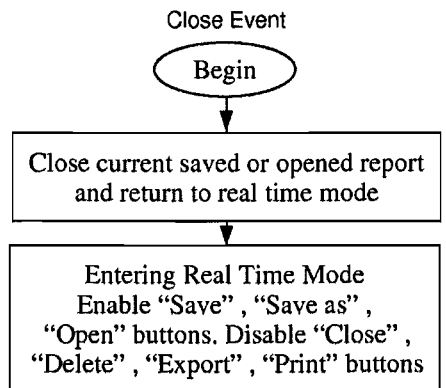
Fig. 3A
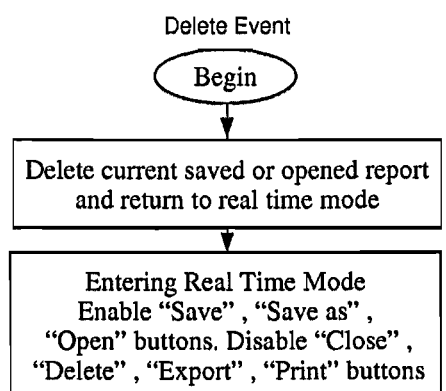
Fig. 3B
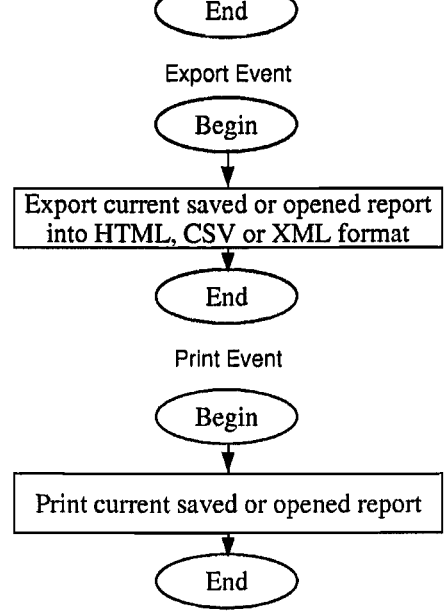
Fig. 3C
Fig. 3D

```
┌─────────────────────────────────────────────────┐
│ 🗎 IntegraXor Report - Microsoft Internet Explorer _ □ × │
├─────────────────────────────────────────────────┤
│ File  Edit  View  Favorites  Tools  Help        │
├──────┬────────┬──────┬───────┬────────┬───────┬──────┤
│ Save │Save As │ Open │ Close │ Delete │ Print │Export│
└──────┴────────┴──────┴───────┴────────┴───────┴──────┘
```

2009/04/09 18:19:50

Real time mode.

High Plant Production Report

| Item | Description | Quantity |
|------|-------------|----------|
| 1 | Part A | 51.74 |
| 2 | Part B | 19.69 |
| 3 | Part C | 2.82 |
| 4 | Part D | 12.91 |
| 5 | Part E | 29.36 |

Done — Local intranet

IntegraXor Report - Microsoft Internet Explorer

File  Edit  View  Favorites  Tools  Help

| Save | Save As | Open | Close | Delete | Print | Export |

2009/04/10 00:20:52

Real time mode.

High Plant Production Report

| Item | Description | Quantity |
|---|---|---|
| 1 | Part A | 4.93 |
| 2 | Part B | 33.83 |
| 3 | Part C | 3.35 |
| 4 | Part D | 12.26 |
| 5 | Part E | 15.24 |

Production Log

| Description Time/Unit | Density (kg/m3) | Pressure (bar g) | Level (m) | Weight (kg) |
|---|---|---|---|---|
| 2009-04-10 00:20:10 | 84.45 | 0.76 | 13.84 | 0.88 |
| 2009-04-10 00:20:20 | 63.11 | 78.60 | 39.26 | 11.95 |
| 2009-04-10 00:20:30 | 9.70 | 30.45 | 61.53 | 69.78 |
| 2009-04-10 00:20:40 | 14.62 | 95.11 | 53.49 | 28.53 |
| 2009-04-10 00:20:50 | 94.56 | 78.63 | 66.92 | 29.47 |

| Summary Data | Average | Maximum | Minimum | Total |
|---|---|---|---|---|
| | 53.29 | 95.11 | 13.84 | 140.61 |

Done  Local intranet

Fig. 10

RAPID SOFTWARE REPORT DEVELOPMENT TOOL WITH AUTO DATABASE HANDLING AND MENU TOOL-BAR PLUG-IN FOR APPLICATION REPORT ACCESS

FIELD OF INVENTION

The present invention resides in the technical field of software generated reports, and more particularly, to the methods of generating reports for computer monitored or aided environments.

BACKGROUND

Traditionally, report generation is a tedious and difficult process in part of software development. Most of the time, the System Integrator (S.I.) engineer has to develop a layout for the viewing screen, link the data source to the viewing screen, and then develop a printing template, and associate the template with the data source to the printout. This printing template creation step is an error prone step, whereby the S.I. engineer may accidentally link the data source (or data variable or tag) wrongly, as the engineer will not be able to review the content of the linked data source before it is printed.

Even if these two steps were completed without any errors, the S.I. engineer will have to further develop the interface for file saving to save the report and file opening for retrieving previously saved reports, and not to mention the interface for exporting the saved reports into another file format.

SUMMARY

A simple, more comprehensive reporting solution for the S.I. engineer is provided where the engineer only needs to develop a report layout page and include or link the report layout page to the data source. Creation and handling of the database is no longer needed, and no additional programming work will be required to provide for viewing, printing, saving, opening or even exporting the collected data.

According to one aspect, there is provided a method for generating reports for a computer monitored or aided environment that comprises a server-side module, a client-side module and a database, the server-side module, client-side module and database being interconnected, the method comprising creating a report layout, the report layout containing a predefined number of dynamic fields at predetermined positions; associating, at the server-side, each dynamic field with a data source; collecting, at the server-side, information for each dynamic field according to the associated data source; storing the information in the database; and displaying the information for each dynamic field on a display according to the report layout; wherein said report layout is shared universally for the generation of a displayed report and a printed report.

In one embodiment, the server-side module parses the report layout, extracts the dynamic field and collects the information for each dynamic field for the report, and stores the information in the database with a time stamp according to a timer.

In another embodiment of the present invention, the server-side module parses the report layout, extracts the dynamic field and collects the information for each dynamic field for the report, and stores the information in the database upon the user's command.

According to one preferred feature, the server-side module assigns storage address to the information for each dynamic field before storing the information into the address.

According to another embodiment of the present invention, the storage address comprises database name, table name and column name.

In another embodiment of the present invention, the storage address is predetermined by the report layout.

According to another embodiment of the present invention, the storage address comprises database name, table name and column name.

According to a further embodiment of the present invention, the client-side module displays a tool-bar like graphic user interface comprising interactive buttons on the display for report handling.

In one embodiment, the client-side module polls the collected information for each dynamic field within the database and provides the user with the option to
a) save a displayed report,
b) open a saved report from said database,
c) close a report on the display,
d) view a real-time dynamic report,
e) print the displayed report,
f) delete a saved report from said database, or
g) export the displayed report to Comma Separated Values (CSV), HTML or XML file formats.

In another embodiment of the present invention, the method further comprising:
generating said displayed report.

According to one embodiment of the present invention,
In one embodiment, the method further comprising:
generating said printed report.

In another embodiment of the present invention, a format of said printed report is in correspondence to a format of said displayed report.

In another aspect, there is provided a system for generating reports for a computer monitored or aided environment that comprises a server-side module, a client-side module, and a database, the server-side module, client-side module and database being interconnected, the system comprising: a tool for creating a report layout, the report layout containing a predefined number of dynamic fields at predetermined positions; a storage device containing computer code to associate each dynamic field with a data source; and a logger in the server-side module for collecting information for each dynamic field according to the associated data source; wherein said report layout is shared universally for the generation of a displayed report and a printed report, using a graphical user interface in the client-side module.

Thus, the invention allows an engineer to quickly develop a report generation software for any system or environment. Even an experienced S.I. engineer will find the simplified approach to generate a report to be less time consuming. The "one-time" layout creation reduces the possibility of printing an erroneous report.

BRIEF DESCRIPTION OF THE DRAWINGS

The invention is illustrated, but not limited, by the following description of preferred embodiments, that is given by way of example only with reference to the accompanying drawings, in which:

FIG. 1A is a table illustrating the differences between a conventional reporting system and a reporting system according to an embodiment of the present invention.

FIG. 1B is a table illustrating the differences of what an S.I. engineer needs to perform in order to manipulate the data collected with a conventional reporting system as opposed to what an S.I. engineer is required to perform with an embodiment of the present invention.

FIG. 3A is a flow chart illustrating the function to close the current report and return the view to real time mode according to an embodiment of the present invention.

FIG. 3B is a flow chart illustrating the function to delete the current saved or open report and return the view to real time mode according to an embodiment of the present invention.

FIG. 3C is a flow chart illustrating the function to export the current saved or open report into HTML, CSV or XML format according to an embodiment of the present invention.

FIG. 3D is a flow chart illustrating the function to print the current saved or open report according to an embodiment of the present invention.

FIG. 6 is a screen shot of the data collected in one instant of time presented in the report according to an embodiment of the present invention.

FIG. 9 is a screen shot of another report screen according to an embodiment of the present invention.

FIG. 10 is a screen shot of another report screen according to an embodiment of the present invention.

DETAILED DESCRIPTION OF THE PREFERRED EMBODIMENTS

According to an embodiment of the present invention, there are fundamentally three steps to build a report generating system into a software application, as illustrated in FIG. 1A.

For the conventional report generating system, the engineer is required to create one report layout for report printout. As for the present invention, the engineer is also required to create a report layout for report printout. However, this report layout is also used for on screen viewing.

Therefore, instead of creating two report layouts, one for printing and then another for viewing the report on screen, the engineer is only required to create one universal layout for use for report printing and report viewing on screen. So instead of creating the same report layout twice, the engineer saves time and reduces the possibility of making mistakes by doing the same work twice. Also, the embodiment of the present invention further incorporates a plug-in tool-bar, or a plug-in graphic user interface that allows the engineer to manipulate the reports readily, rather than having to create mechanisms to save and retrieve the data for the reports from the database. Normally, the engineer has to store the data as SQL statements or common flat files. The plug-in tool-bar or plug-in graphic user interface is presented to the engineer once the client-side module is linked to the display.

In the conventional reporting system, a mechanism is created to save and restore data from the database. Normally, this is done by way of a database oriented approach. A data source storage path or storage address must be prepared in advance in order for the reporting system to save and later extract the data to be displayed.

In an embodiment of the present invention, the above step was done by way of tag oriented approach. With this approach, no storage path or storage address needs to be prepared in advance. Instead, the system will create the storage path or storage address automatically based on the tag name. The tag name will be used for extraction of the data source for display.

In the present invention, the S.I. engineer can also choose to or not fine-tune the system and it would have all its default values/setting.

The fundamental three steps to build a report generating system into a software application are:
1) Create a report layout to be shared between screen viewing and printout.
2) Associate data field with the data source, and
3) Set the auto-logging rate (server side configuration).

Details for performing each of the above steps are elaborated within the description.

Figure 1C:
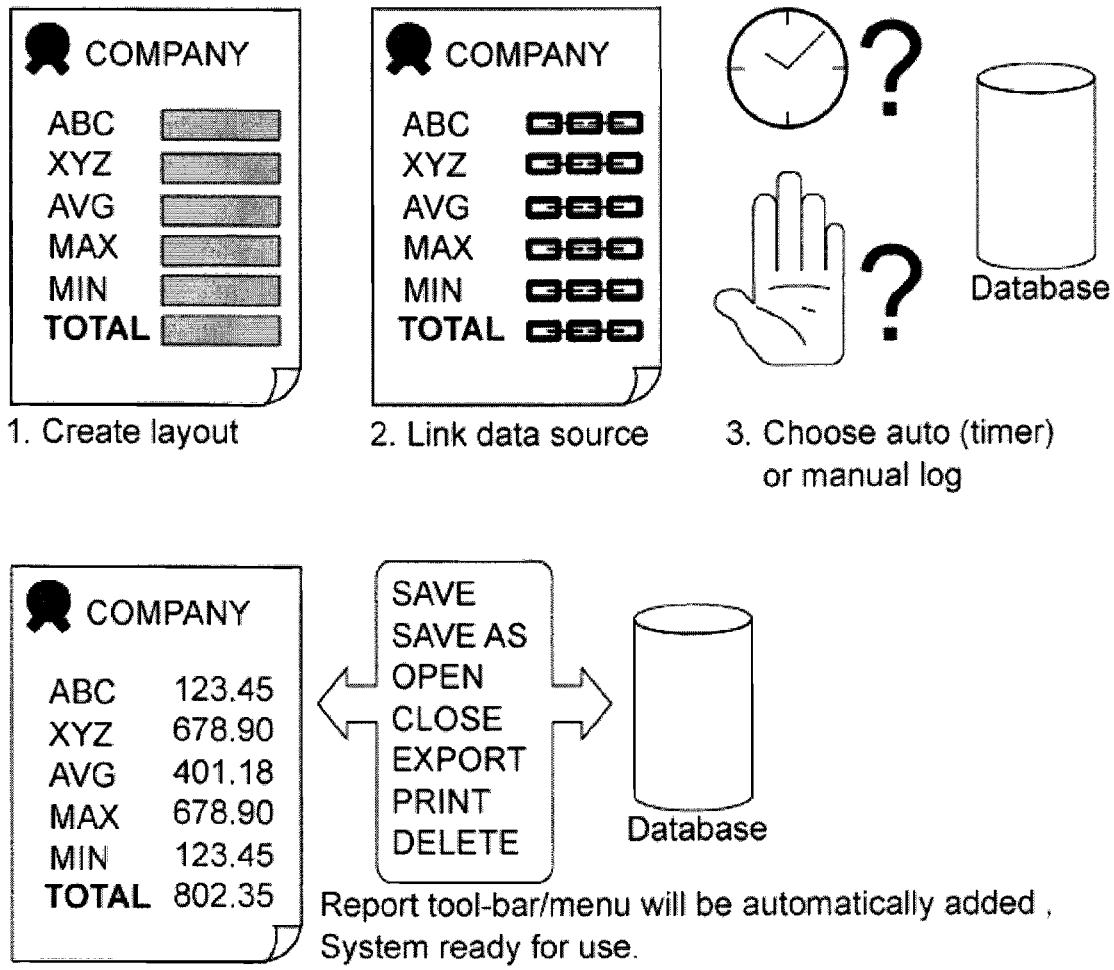
FIG. 1C illustrates the basic steps required by an S.I. engineer to generate a report according to an embodiment of the present invention.

FIGS. 1B and 1C further illustrate the differences between the existing system and a report generating system according to an embodiment of the present invention.

For both systems, the S.I engineer creates tag and link to data source or prepares logic to calculate its data. The S.I. engineer then creates report layout or formatting (tables, etc) and adds in the tags.

The engineer then specifies the logging rate for archiving, i.e. a timer to collect information from the data source and store the information into a storage medium, such as a hard drive or a server.

From this point onward, the two systems begin to diverge in terms of operation.

For the conventional report generating system, the S.I engineer is required to repeat inputting tags for archiving, for viewing on screen and for viewing live or fixed (saved) data.

For the present invention however, one can use the same tag input from the report layout steps and for archiving, viewing on screen and for viewing live or fixed (saved) data. The client-side module further inserts a plug-in tool-bar, or a plug-in graphic user interface that allows the engineer to use or access the data readily.

Figure 1D:
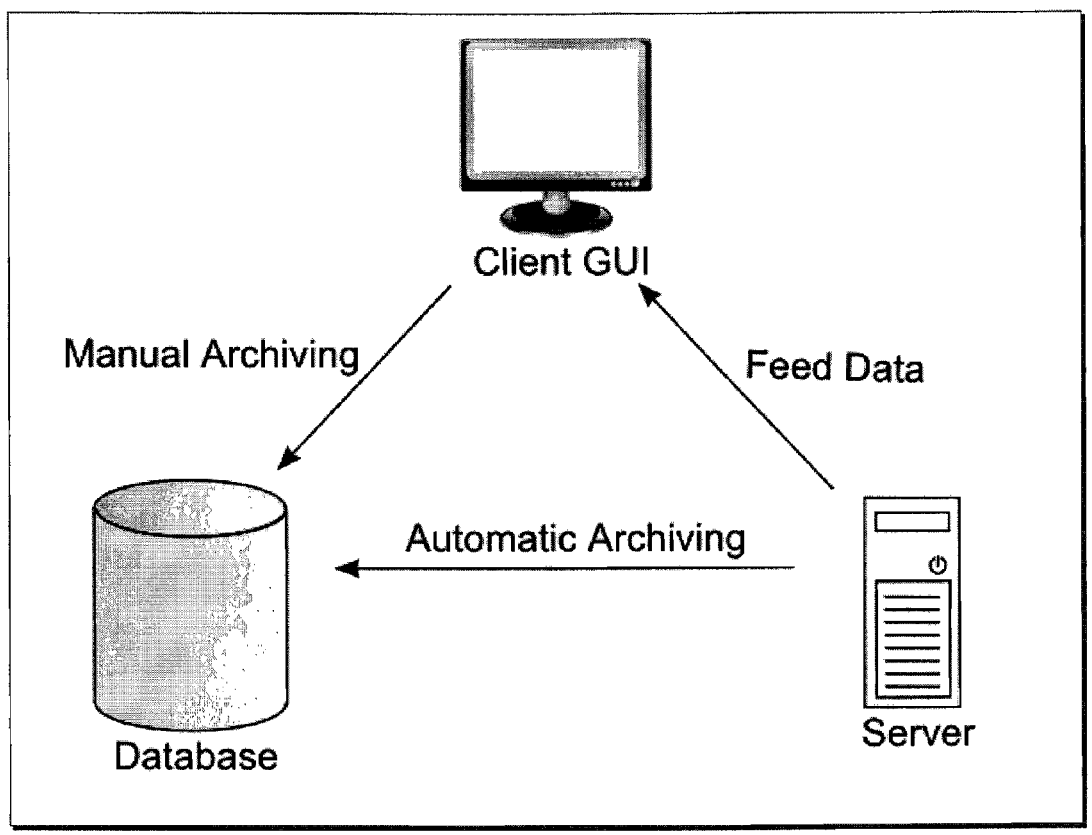
FIG. 1D illustrates the connections between the three major components involved in displaying, collecting and storing live data according to an embodiment of the present invention.

The system is split into client-side module and server-side module, as indicated in FIG. 1D. The database may be a hard drive with a massive storage, or any device that can store huge amounts of digital data.

For the client-side, the System Integrator (S.I.) Engineer needs to first create a standard compliant report layout, which can be in HTML format, or a file type that is XML compliant. The engineer then associates the relevant HTML element's (e.g. table cell <td>, span <span>, or division <div>) ID with data source. The engineer then includes the client-side module, which can be a Java Script that is commonly known as a Scriptlet. Once the script is included and the HTML page is loaded, the plug-in tool-bar will be automatically inserted and displayed on top of the HTML report layout. With that the user shall be able to view real time data, and then choose to save the data with any filename with associated timestamps, open saved data from the storage medium such as a hard drive, close the viewing of archived data, export the archived data into another HTML file, XML or Comma Separated Values (C.S.V.) and print any currently on screen or archived data. The data can be saved into any one of several file formats such as fixed HTML pages or eXtensible Markup Language (XML) pages. The stored data can be copied, deleted or maintained individually. Alternatively, the data can also be saved into an SQL compliant database.

For the server-side, the S.I. Engineer will need to perform calculation with their concerned data, such as data averaging, and set the data into tags. Then, the server-side module will automatically read (parse) the report layout and when it detects the tag for one particular field (data cell), it will read the tag from the server memory, and then save the data into the database. The engineer will also need to configure the server side configuration file to tell the server-side module which report layout file and the time to trigger it. The triggering time is meant for archiving time, for instance, an hourly timer is configured to generate hourly reports, daily timer for daily reports, weekly timer on specific day for weekly reports, etc. The S.I. engineer may also turn on the auto print function if desired, and the report will be printed automatically after it has been archived by the timer.

For automatic calculation or data manipulation, the syntax (or code) within the layout is written based on JSON (Java Script Object Notation) format. This syntax or code can be placed as an ID or any attribute for an field element. It allows the S.I. engineer to link a field (data cell) to data source (tag/variable), or even further enhance or control the data source association. Below is a sample of the said syntax (or code).

{attr: 'get', tag: 'tagname'}

However, the number of decimal point or format of the floating point data will be controlled directly from within the element content, for instance <td> (table data cell in HTML) value of ##.# shall display a numerical data with one decimal point.

Very often a report may have content that logged with different data in repeated rows. Best real life examples of such print out is statement printing for banking account and phone bills. No special instruction or additional programming is needed for repeated content printing. All the S.I. engineer needs to do is to create a table with Header Row and a single Data row. The report generating system will automatically extract and iterate through all logged data and tabulate them accordingly. If a report footer is needed, one more row can be added at the end of the Data row, and additional syntax attribute can be added for more data calculation. For instance, 'sum', 'avg', 'max' and 'min'.

The list of available syntax is as follows:

{attr:'get', tag:'tagname'}
{attr:'log', tag:'tagname'}
{attr:'avg', tag:'tagname'}
{attr:'max', tag:'tagname'}
{attr:'min', tag:'tagname'}
{attr:'sum', tag:'tagname'}

Figure 1E:
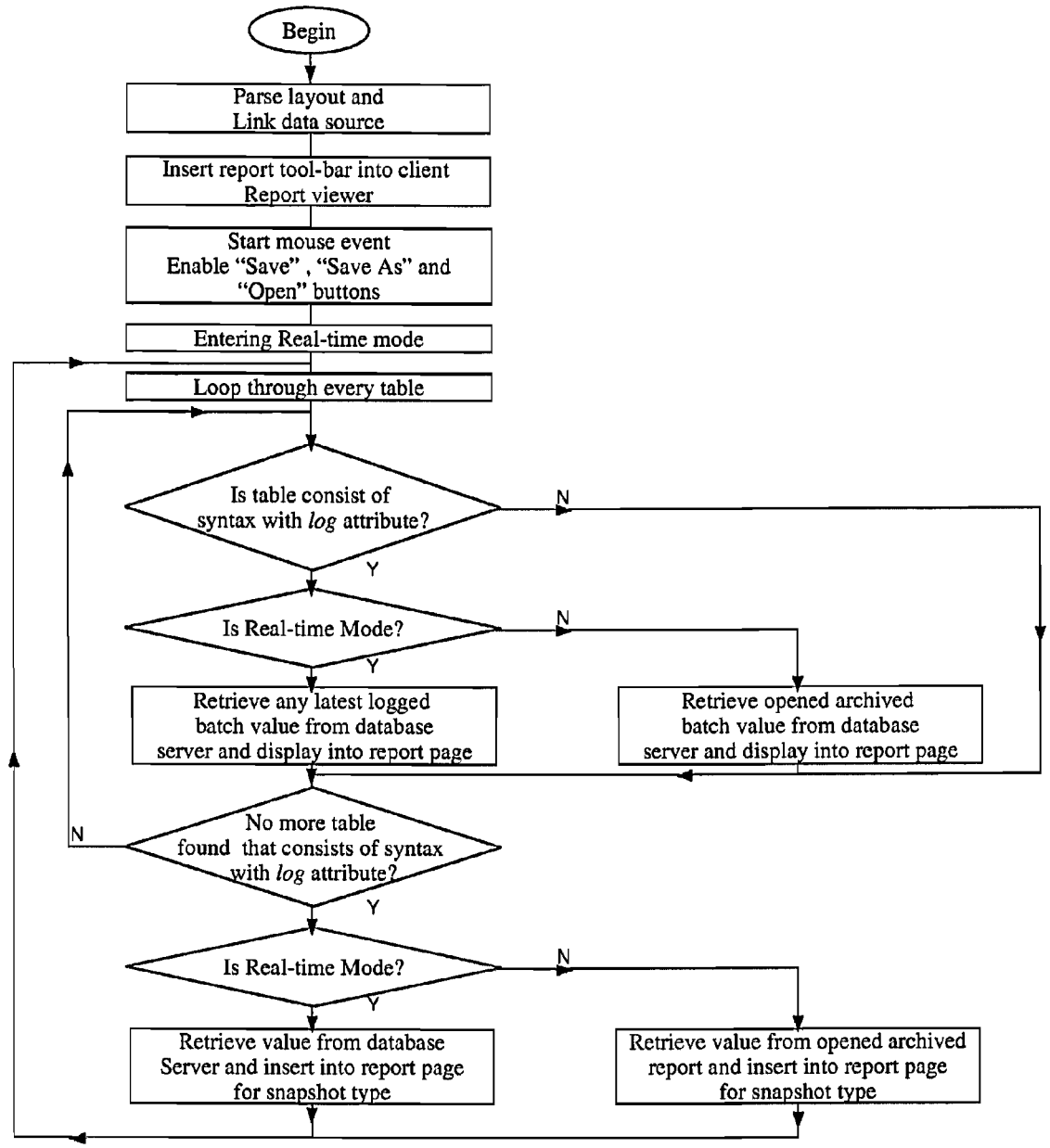
FIG. 1E is a flow chart illustrating the operation of the report generating system according to an embodiment of the present invention.

The flowchart in FIG. 1E describes how the system functions once it is launched. The report generating system begins by parsing the layout and linking the data source as defined by the S.I. engineer. The report generating system then inserts the plug-in tool-bar (or graphic user interface) as described earlier into the display linked to the client-module. The plug-in tool-bar is shown in FIGS. 6 through 7, 9 and 10. The system then enables the mouse and then further enables the following buttons on the plug-in tool-bar: Save, Save As and Open. The system then enters the real-time mode and loops through every table inputted by the engineer.

The system goes through the codes inputted by the engineer to see if there are any tables containing syntax with "log" attribute. If none is found, the system then goes to confirm that there are no more tables containing syntax with "log" attribute.

If syntax with "log" attribute is found, the system confirms whether it is in real-time mode. If the system is in real time mode, it retrieves any latest logged batch value from the database server and inserts them into the report page. Otherwise, it retrieves the open archived batch value from the database server and inserts them into the report page. For either case, the system will then make sure that there are no further tables in the codes containing syntax with "log" attribute before refreshing the data on the screen.

Figure 2A:
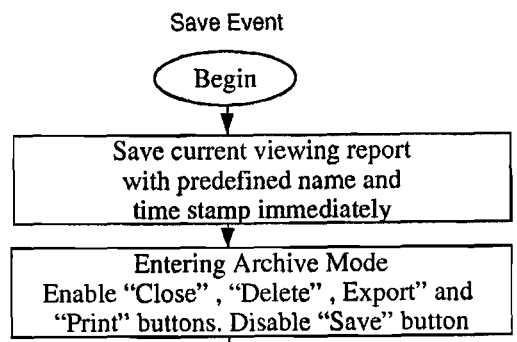
FIG. 2A is a flow chart illustrating the function to save a current report into a storage medium according to an embodiment of the present invention.

The flowchart in FIG. 2A shows the steps taken by the system when the user wants to save a current report on display. Upon receiving a mouse click from the user (clicking the Save button), the system saves the current report on display with predefined name and time stamp. Upon saving the report, the system enters the archive mode and then enables the Close, Delete, Export and Print buttons. It disables the Save button so the user does not save a duplicate report.

Figure 2B:
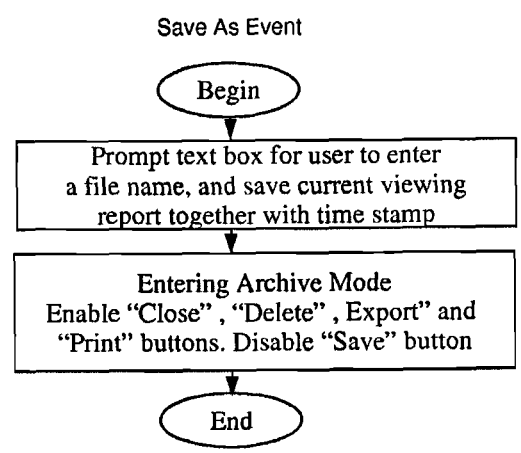
FIG. 2B is a flow chart illustrating the function to save a current report using a user selected name into a storage medium according to an embodiment of the present invention.

Flowchart in FIG. 2B shows the steps taken by the system when the user wants to save a current report on display with a predefined name. Upon receiving a mouse click from the user (clicking the Save As button), the system launches a text box to prompt the user to enter a file name. It then saves the current report on display together with the associated time stamp. The system then enters the archive mode and then enables the Close, Delete, Export and Print buttons. It disables the Save button so the user does not save a duplicate report.

Figure 2C:
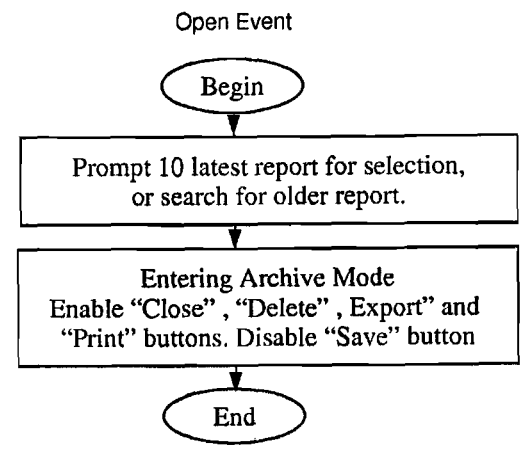
FIG. 2C is a flow chart illustrating the function to open a previously-saved report from the storage medium according to an embodiment of the present invention.

The flowchart in FIG. 2C shows the steps taken by the system when the user wants to open an archived report from the database server. Upon receiving a mouse click from the user (clicking the Open button), the system launches a text box that displays the 10 most recent reports for the user's selection, or allows the user to search for older reports. After that, the system enters the archive mode and then enables the Close, Delete, Export and Print buttons. It disables the Save button so the user does not save a duplicate report.

Flowchart in FIG. 3A shows the steps taken by the system when the user wants to close a report currently on display. Upon receiving a mouse click from the user (clicking the Close button), the system closes the current report on display (whether it is a saved report or an opened report from the database server). The system then enters the real time mode, and then enables the Save, Save As and Open buttons. The system disables the Close, Delete, Export and Print buttons.

Flowchart in FIG. 3B shows the steps taken by the system when the user wants to delete a currently saved report or a report on display. Upon receiving a mouse click from the user (clicking the Delete button), the system deletes the saved report or the report on display and then enters the real time mode. The system enables the Save, Save As and Open buttons and disables the Close, Delete, Export and Print buttons.

The flowchart in FIG. 3C shows the steps taken by the system when the user wants to export a currently saved report or a report on display. Upon receiving a mouse click from the user (clicking the Export button), the system exports the saved report or the report on display into either HTML, CSV or XML format according to the user.

The flowchart in FIG. 3D shows the steps taken by the system when the user wants to print a currently saved report or a report on display. Upon receiving a mouse click from the user (clicking the Print button), the system prints the saved report or the report on display.

Figure 4:
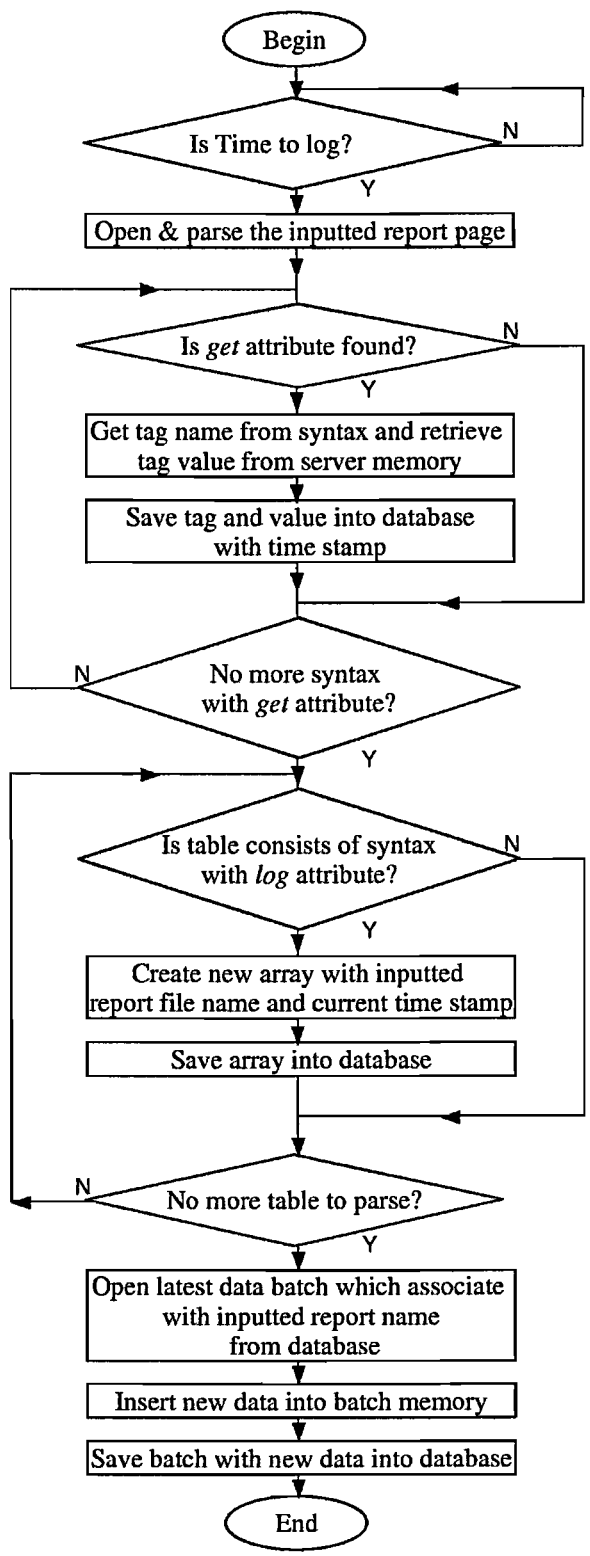
FIG. 4 is a flow chart illustrating the steps taken by the server-side module while the report generating software is running according to an embodiment of the present invention.

The flowchart in FIG. 4 describes the functioning of the system, particularly of the server-side module. Once the system is launched, the system begins to check whether it is time to log information from the monitored system or environment. The system will not open and parse the inputted report page until it is time for the system to log. Once the time to log has been reached, the system checks the report page for any syntax with the "get" attribute.

If the "get" attribute is found, the system gets the tag name from the syntax and retrieves the tag value from the server memory. The system then proceeds to save the tag and its associated value into the database with the associated time stamp. The system then checks the report page for any remaining syntax with the "get" attribute. If further "get" attributes are found, the system will continue to fetch tag names from syntax and retrieve tag values from server memory and save them into the database with the associated time stamp.

After the system has gone through every "get" attribute in the report page, it proceeds to scan the table in the report page for any "log" attribute. If a "log" attribute is found, the system creates a new data array with the inputted report file name and the current time stamp. The system then saves the data array into the database. If there is more table to parse in the report page, the system will go back into the report page to look for more syntax with "log" attribute.

Once the script has finished parsing all tables, the system will proceed to open the latest data batch which is associated with the inputted report name from the database. The system then inserts the new data into batch memory, and then saves the content of the batch memory with the new data into the database.

Figure 5:
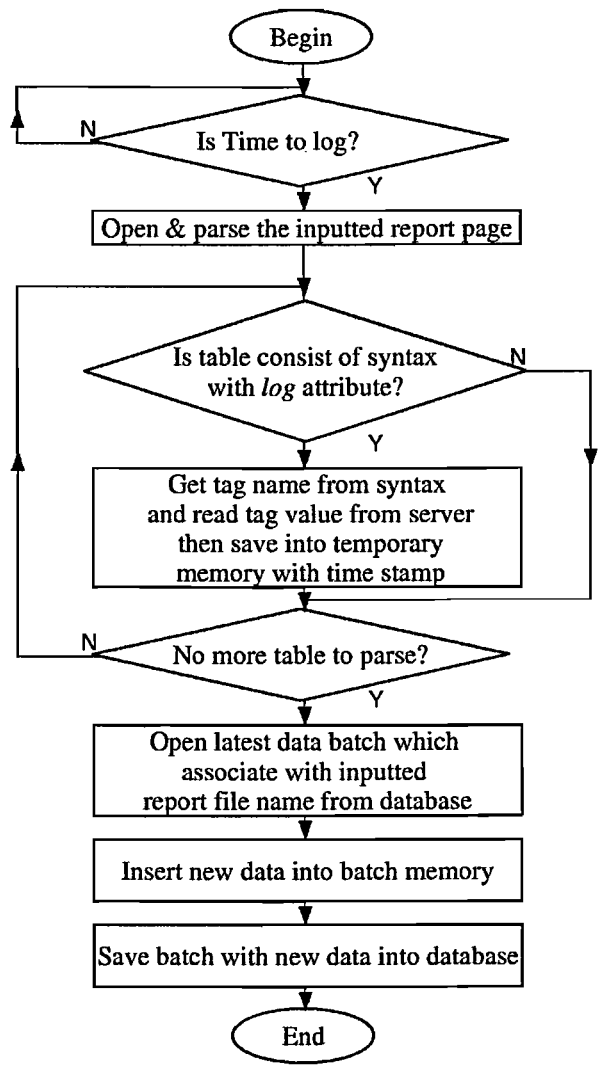
FIG. 5 is a flow chart illustrating the steps taken by the server-side module to periodically collect information based on pre-configured timer from the system or environment according to an embodiment of the present invention.

The flow chart in FIG. 5 illustrates how the interval logging function operates for an embodiment of the present invention. The system checks whether it is time to log information from the monitored system or environment. Once it is time, the system starts parsing the inputted report page when it is time for the system to log. The system checks the table within the report page to look for syntax with the "log" attribute.

If the "log" attribute is found, the system retrieves the tag name from the syntax and reads the tag value from the server. It then proceeds to save the value into a temporary memory with the time stamp. If there are more tables to parse, the system will proceed to retrieve more tag names from other tables and place them into the temporary memory with the associated time stamp. Once all the tables have been parsed, the system opens the latest data batch which is associated with the inputted report name from the database. The system then inserts the new data into batch memory, and then saves the content of the batch memory with the new data into the database.

FIG. 6 is a typical snapshot report collecting all data in an instant of time. The first step to produce a report is to create a report layout. The user needs to ensure that the HTML report layout file is XML compliant, or in another word, XHTML compliant. All HTML element must be written in lowercase and closed accordingly. For instance, <td> musts be followed by </td> after typing its content. The user must not leave <td> open and insert another <td>. A line break shall be <br/> and a horizontal break shall be <hr/>.

The second step is the linking process that involves adding tags into the layout, and adding links to the report module.

The third and final step is the configuration of the server side, which involves calculating data and specifying the timer for archiving. It is the user or the S.I. engineer's responsibility to make the data available in the server memory, whether to poll the data from external sources or collect the result of a set of calculations.

Archiving and saving the data onto a disk is a common needed feature. It can be done manually by the user on the graphic user interface (GUI) as shown in FIG. 1D during runtime, or automatically based on a timer. Manual archiving will not be necessary.

Creating Layout

The following is a sample of a standard compliant HTML layout for a production report. It was named as rpt.htm. The bolded script's inclusion of igr8.js and rpt_ui.js is needed to add in the reporting tool-bar (plug-in graphic user interface) and also perform XML Http Request technique to transfer data between client and server.

```
<html xmlns="http://www.w3.org/1999/xhtml">
  <head>
    <title>IntegraXor Report</title>
    <style type="text/css">
      th      {text-align: left}
      td      {text-align: left}
    </style>
  </head>
  <body>
    <h2>High Plant Production Report</h2>
    <table width=50%>
      <tr>
        <th>Item</th><th>Description</th><th>Quantity</th>
      </tr>
      <tr>
        <td>1</td><td>Part A</td><td></td>
      </tr>
      <tr>
        <td>2</td><td>Part B</td><td></td>
      </tr>
      <tr>
        <td>3</td><td>Part C</td><td></td>
      </tr>
      <tr>
        <td>4</td><td>Part D</td><td></td>
      </tr>
      <tr>
        <td>5</td><td>Part E</td><td></td>
      </tr>
    </table>
  <body>
  <script language="text/javascript" src="./system/scripts/igr8.js"></script>
  <script language="text/javascript" src="./system/scripts/rpt_ui.js"></script>
</html>.
```

Figure 7:
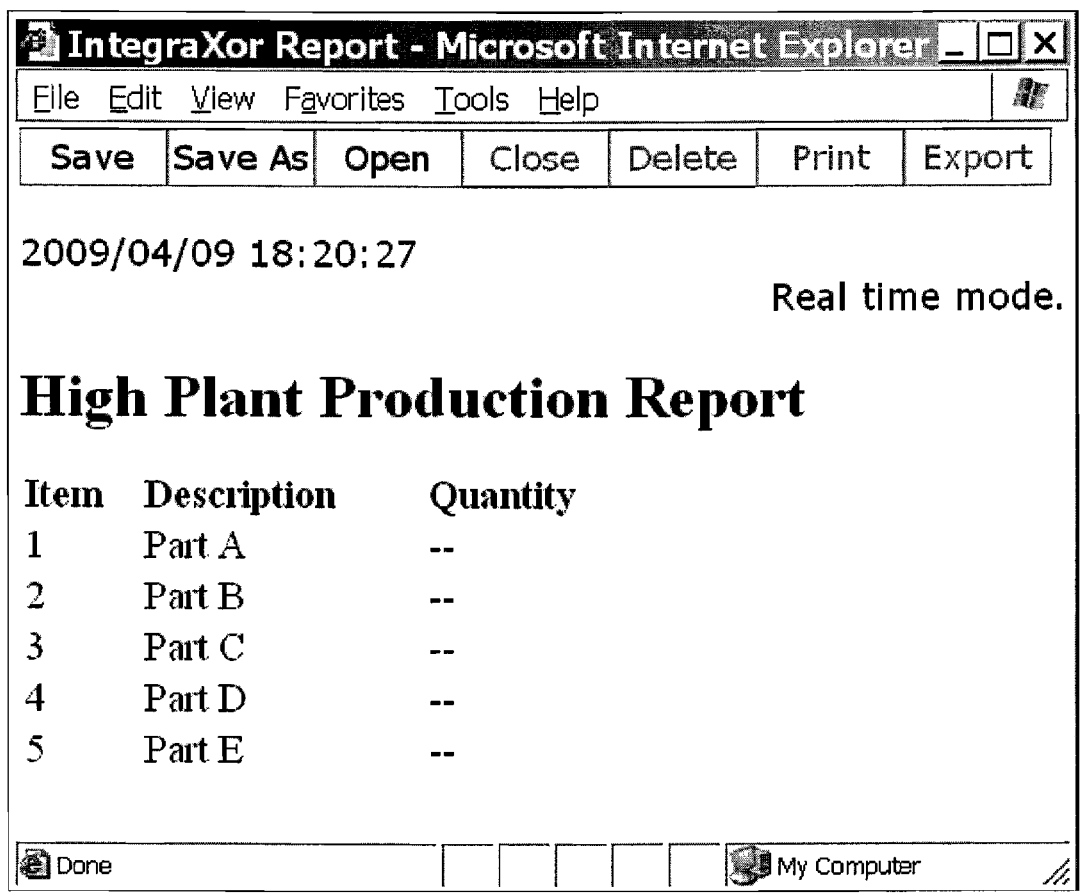
FIG. 7 is a screen shot of a blank report screen according to an embodiment of the present invention.

The output of the browser from the above codes is shown in FIG. 7.

Link to Data Source

Once a layout is created, the S.I. engineer needs to associate a dynamic field with the desired tag. To associate a data field with a tag, the engineer needs to add in a JSON (Java Script Object Notation) compliant syntax as its ID like this: {attr:'get',tag:'tagname'}. The bolded section below is an example of the earlier script after adding in the tag links.

```
<html xmlns="http://www.w3.org/1999/xhtml">
<head>
    <title>IntegraXor Report</title>
    <style type="text/css">
        th {text-align: left}
        td {text-align: left}
    </style>
</head>
<body>
    <h2>High Plant Production Report</h2>
    <table width="50%">
    <tr>
    <th>Item</th><th>Description</th><th>Quantity</th>
    </tr>
    <tr>
    <td>1</td><td>Part A</td><td id="{attr: 'get', tag: 'part_a'}"></td>
    </tr>
    <tr>
    <td>2</td><td>Part B</td><td id="{attr: 'get', tag: 'part_b'}"></td>
    </tr>
    <tr>
    <td>3</td><td>Part C</td><td id="{attr: 'get', tag: 'part_c'}"></td>
    </tr>
    <tr>
    <td>4</td><td>Part D</td><td id="{attr: 'get', tag: 'part_d'}"></td>
    </tr>
    <tr>
    <td>5</td><td>Part E</td><td id="{attr: 'get', tag: 'part_e'}"></td>
    </tr>
    </table>
</body>
<script language="text/javascript" src="./system/scripts/igr8.js"></script>
<script language="text/javascript" src="./system/scripts/rpt_ui.js"></script>
</html>
```

If the HTML editor in use does not allow duplicated ID string, the engineer can simply add in one more attribute with any number, preferably number in sequence for systematic sake. For instance, {attr:'get', tag:'tagname', dum: 'NNN'}, where NNN is a series of numbers that plays the role to differentiate the element ID.

Server Side Configuration

The following step is not necessary for manual archiving. Automatic archiving based on a timer will require this configuration. This example is to cause the system to generate a daily production report at 6 a.m. All data shall be calculated by 6 a.m. for use. If there is a server script for this process, the script shall be triggered by a timer at 6 a.m. In this example, the tags for 'part_a', 'part_b', 'part_c', 'part_d' and 'part_e' shall have its data furnished by 6 a.m.

Auto archiving is normally completed with a slight delay after the calculation triggering time. Depending on external factors like communication delays or time synchronization problem between the PC and the connected devices, the delay can range from a few seconds to 5 minutes, or even more in certain extreme cases. In this example it is assumed that the data will be ready in at most 5 seconds, so a timer can be created at 06:00:05, and trigger the report that was named rpt.htm above daily. The engineer can also choose to have the report printed automatically if required by the user.

Figure 8:
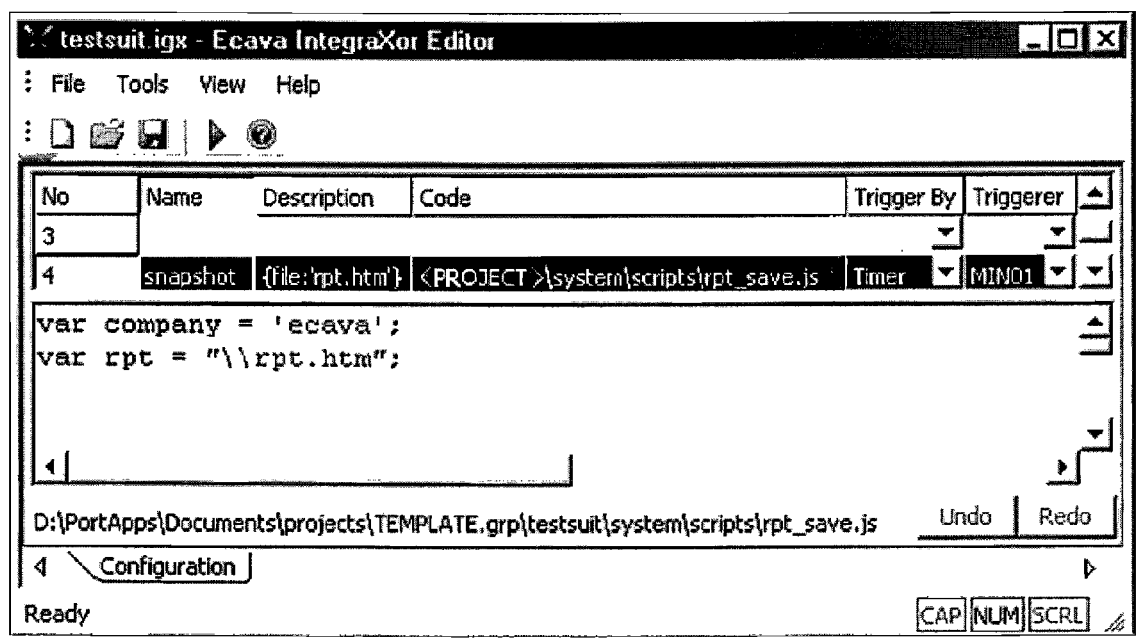
FIG. 8 is a screen shot of the graphic user interface of the server-side module according to an embodiment of the present invention.

FIG. 8 shows the graphic user interface of the server-side module. The user will be able to easily enable or disable and configure the timer using the interface.

Statement Printing Configuration

The present invention also allows data accumulation in a growing table like a statement report. Common examples of a statement report are phone bills, which contains call logging; banking statements, with transaction listing; and credit card statements. However, for industrial automation, a statement report normally contains batch of processes that span through a certain duration of the production time.

To insert accumulation data into a report, the syntax must be entered into a table, so that the data will grow within the table. The bolded portion of the script below is the section that caters for this purpose.

```
<html xmlns="http://www.w3.org/1999/xhtml">
<head>
    <title>IntegraXor Report</title>
    <style type="text/css">
        th {text-align: left}
        td {text-align: left}
    </style>
</head>
<body>
<h2>High Plant Production Report</h2>
<table width="60%">
<tr>
    <th>Item</th><th>Description</th><th>Quantity</th>
</tr>
<tr>
    <td>1</td><td>Part A</td><td id="{attr: 'get',
    tag: 'part_a'}">#.##</td>
</tr>
<tr>
    <td>2</td><td>Part B</td><td id="{attr: 'get',
    tag: 'part_b'}"># .##</td>
</tr>
<tr>
    <td>3</td><td>Part C</td><td id="{attr: 'get',
    tag: 'part_c'}">#.##</td>
</tr>
<tr>
    <td>4</td><td>Part D</td><td id="{attr: 'get',tag:
    'part_d'}">#.##</td>
</tr>
<tr>
    <td>5</td><td>Part E</td><td id="{attr: 'get',tag:
    'part_e'}">#.##</td>
</tr>
</table>
<h3>Production Log</h3>
<table width="100%">
    <tr>
        <th>Description</th>
        <th>Density</th>
        <th>Pressure</th>
        <th>Level</th>
        <th>Weight</th>
    </tr>
    <tr>
        <td>Time/Unit</td>
        <td>(kg/m3)</td>
        <td>(bar g)</td>
        <td>(m)</td>
        <td>(kg)</td>
    </tr>
    <tr>
        <td></td>
        <td>#.##</td>
        <td>#.##</td>
```

-continued

```
    <td>#.##</td>
    <td>#.##</td>
  </tr>
  <tr>
    <td colspan="5"><hr /></td>
  </tr>
  <tr>
    <td>Summary</td>
    <td>Average</td>
    <td>Maximum</td>
    <td>Minimum</td>
    <td>Total</td>
  </tr>
  <tr>
    <td>Data</td>
    <td>#.##</td>
    <td>#.##</td>
    <td>#.##</td>
    <td>#.##</td>
  </tr>
</table>
</body>
<script type="text/javascript" src="system/scripts/igr8.js"></script>
<script type="text/javascript" src="system/scripts/rpt_ui.js"></script>
</html>
```

Figure 9:
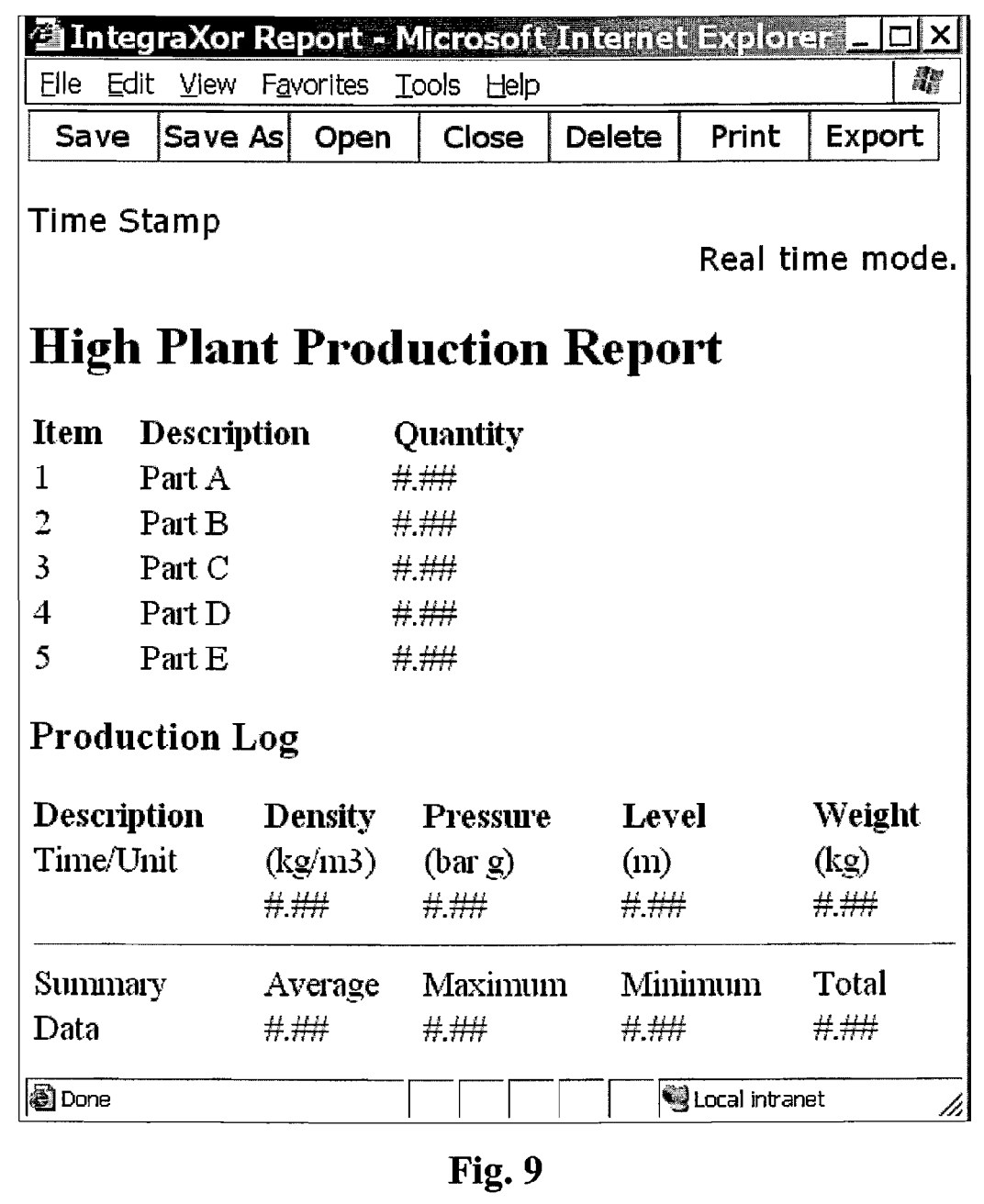

The output of the above script is as indicated in FIG. 9.

Once a table is created, the S.I. engineer needs to associate a dynamic field with the desired tag. To associate a data field with a tag for growing table row entry, the engineer will have to add in the syntax as its ID in the following manner: {attr: 'log',tag:'tagname'}.

The following is what the above script will look like after the tag links have been added into it.

```
<html xmlns="http://www.w3.org/1999/xhtml">
<head>
  <title>IntegraXor Report</title>
  <style type="text/css">
    th {text-align: left}
    td {text-align: left}
  </style>
</head>
<body>
<h2>High Plant Production Report</h2>
<table width="60%">
  <tr>
    <th>Item</th><th>Description</th><th>Quantity</th>
  </tr>
  <tr>
    <td>1</td><td>Part A</td><td id="{attr: 'get',
    tag: 'part_a' }">#.##</td>
  </tr>
  <tr>
    <td>2</td><td>Part B</td><td id="{attr: 'get',
    tag: 'part_b' }"># .##</td>
  </tr>
  <tr>
    <td>3</td><td>Part C</td><td id="{attr: 'get',
    tag: 'part_c' }">#.##</td>
  </tr>
  <tr>
    <td>4</td><td>Part D</td><td id="{attr: 'get',
    tag: 'part_d' }">#.##</td>
  </tr>
  <tr>
    <td>5</td><td>Part E</td><td id="{attr: 'get',
    tag: 'part_e' }">#.##</td>
  </tr>
</table>
<h3>Production Log</h3>
<table width="100%">
  <tr>
    <th>Description</th>
    <th>Density</th>
```

```
    <th>Pressure</th>
    <th>Level</th>
    <th>Weight</th>
  </tr>
  <tr>
    <td>Time/Unit</td>
    <td>(kg/m3)</td>
    <td>(bar g)</td>
    <td>(m)</td>
    <td>(kg)</td>
  </tr>
  <tr>
    <td id="{attr:'log',tag:'time'}"></td>
    <td id="{attr:'log',tag:'part_a'}">#.##</td>
    <td id="{attr:'log',tag:'part_b'}">#.##</td>
    <td id="{attr:'log',tag:'part_c'}">#.##</td>
    <td id="{attr:'log',tag:'part_d'}">#.##</td>
  </tr>
  <tr>
    <td colspan="5"><hr /></td>
  </tr>
  <tr>
    <td>Summary</td>
    <td>Average</td>
    <td>Maximum</td>
    <td>Minimum</td>
    <td>Total</td>
  </tr>
  <tr>
    <td>Data</td>
    <td>#.##</td>
    <td>#.##</td>
    <td>#.##</td>
    <td>#.##</td>
  </tr>
</table>
</body>
<script type="text/javascript" src="system/scripts/igr8.js"></script>
<script type="text/javascript" src="system/scripts/rpt_ui.js"></script>
</html>
```

It is common to have additional summary at the last row of the statement report. Built-in calculations that are available for user are average (avg), maximum (max), minimum (min) & summation (sum). Set the attribute (attr) to the desired calculation syntax in the bracket above.

The following is what the above script will look like after the additional summary row configured with the summary syntax has been added to it.

```
<html xmlns="http://www.w3.org/1999/xhtml">
<head>
  <title>IntegraXor Report</title>
  <style type="text/css">
    th {text-align: left}
    td {text-align: left}
  </style>
</head>
<body>
<h2>High Plant Production Report</h2>
<table width="60%">
  <tr>
    <th>Item</th><th>Description</th><th>Quantity</th>
  </tr>
  <tr>
    <td>1</td><td>Part A</td><td id="{attr: 'get',
    tag: 'part_a' }">#.##</td>
  </tr>
  <tr>
    <td>2</td><td>Part B</td><td id="{attr: 'get',
    tag: 'part_b' }"># .##</td>
  </tr>
  <tr>
    <td>3</td><td>Part C</td><td id="{attr: 'get',
    tag: 'part_c' }">#.##</td>
```

```
                </tr>
                <tr>
                    <td>4</td><td>Part D</td><td id="{attr: 'get',
                        tag: 'part_d'}">#.##</td>
                </tr>
                <tr>
                    <td>5</td><td>Part E</td><td id="{attr: 'get',
                        tag: 'part_e'}">#.##</td>
                </tr>
            </table>
            <h3>Production Log</h3>
            <table width="100%">
                <tr>
                    <th>Description</th>
                    <th>Density</th>
                    <th>Pressure</th>
                    <th>Level</th>
                    <th>Weight</th>
                </tr>
                <tr>
                    <td>Time/Unit</td>
                    <td>(kg/m3)</td>
                    <td>(bar g)</td>
                    <td>(m)</td>
                    <td>(kg)</td>
                </tr>
                <tr>
                    <td id="{attr:'log',tag:'time'}"></td>
                    <td id="{attr:'log',tag:'part_a'}">#.##</td>
                    <td id="{attr:'log',tag:'part_b'}">#.##</td>
                    <td id="{attr:'log',tag:'part_c'}">#.##</td>
                    <td id="{attr:'log',tag:'part_d'}">#.##</td>
                </tr>
                <tr>
                    <td colspan="5"><hr /></td>
                </tr>
                <tr>
                    <td>Summary</td>
                    <td>Average</td>
                    <td>Maximum</td>
                    <td>Minimum</td>
                    <td>Total</td>
                </tr>
                <tr>
                    <td>Data</td>
                    <td id="{attr:'avg',tag:'part_a'}">#.##</td>
                    <td id="{attr:'max',tag:'part_b'}">#.##</td>
                    <td id="{attr:'min',tag:'part_c'}">#.##</td>
                    <td id="{attr:'sum',tag:'part_d'}">#.##</td>
                </tr>
            </table>
        </body>
        <script type="text/javascript" src="system/scripts/igr8.js"></script>
        <script type="text/javascript" src="system/scripts/rpt_ui.js"></script>
</html>
```

When the report generation system is running with the above script with data being fed into the system, the output of the above script will be as shown in FIG. 10.

On top of existing report triggering, interval log or accumulation data must be triggered by another (additional) sequence of timer.

Figure 11:
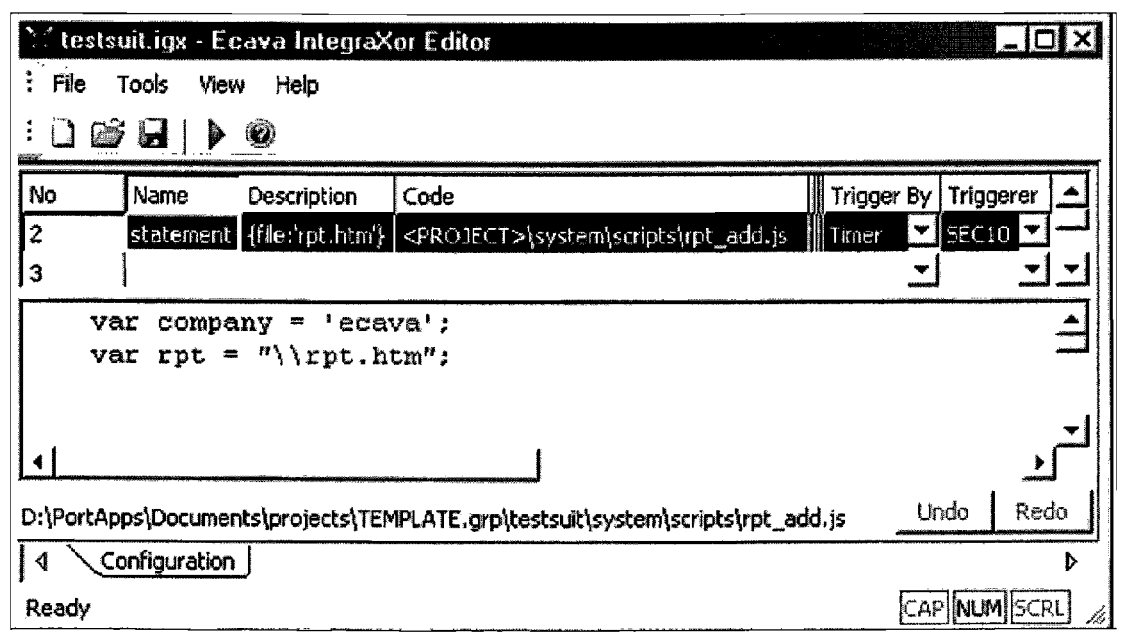
FIG. 11 is a screen shot of the graphic user interface of the server-side module according to an embodiment of the present invention.

For instance, a daily hour-based logging will have 24 times of interval logging. In this case, the layout file of rpt.htm will be parsed for archiving daily, and being parsed and log in hourly interval. FIG. 11 is the server side screen shot for the configuration. One standard entry is to link to rpt_save.js. As compared to snapshot report, another additional entry for interval log is to link to rpt_add.js, which is meant for statement report.

Report Toolbar Menu

As mentioned earlier in the description, the script <script type="text/javascript" src="system/scripts/rpt_ui.js"></script> loads the Java Script "rpt_ui.js" at the top of the browser page as shown in FIGS. 6, 7, 9 and 10. The Java Script "rpt_ui.js" displays a graphical user interface comprising several file management buttons. They are Save, Save As, Open, Close, Print, Export and Delete.

Figure 12:
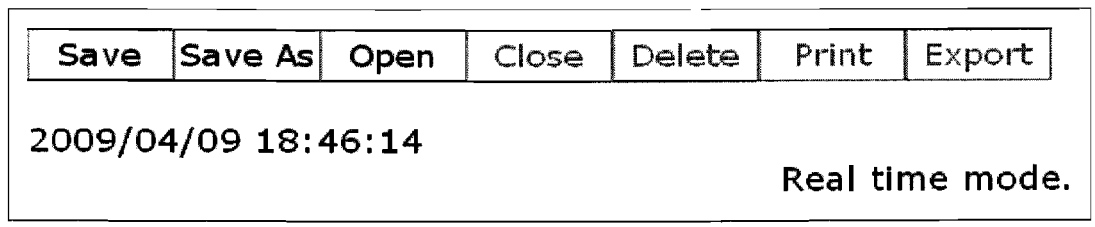
FIG. 12 is a screen shot of the graphic user interface of the client-side module according to an embodiment of the present invention.
Figure 13:
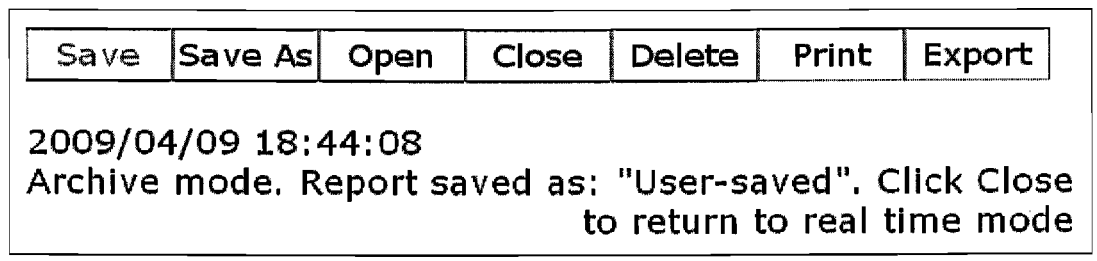
FIG. 13 is a screen shot of the graphic user interface of the client-side module according to an embodiment of the present invention.

As shown in FIG. 12, the buttons Save, Save As and Open are enabled during real time mode, while all buttons are enabled except for the Save button in the archive mode, as shown in FIG. 13.

As shown in FIG. 13, the Save button is disabled in archive mode. When the Save button is clicked in real-time mode, all live data will be archived into the database instantly with timestamps, and then automatically loaded onto the display. The system then enters the archive mode showing the latest batch of saved data. The Close button is enabled in the archive mode so the user could go back to real-time mode by closing the display of the latest batch of saved data.

The Save As button provides the user with the option to save the live data with a user-defined name.

The Open button is enabled at all times. When the button is clicked either in real-time mode or archive mode, a dialog box will pop up and display the default directory, prompting the user to select an archived data for viewing. Once an archived data is open, the message bar shall display information to indicate that the report viewer (browser) has entered into the archive mode. The data on the screen will also stop updating.

Clicking the Close button shall put the system back to the real-time mode.

When the Print button is clicked, a dialog box shall pop up, so user can print the on screen data to the desired printer. The Print button is available in the archive mode. The printing function prints the data as displayed on screen.

When the Export button is clicked, a dialog box like Save As shall pop up with additional option, so the user can pick to export the current data on display into HTML file, Comma Separated Values or XML file. The Export button is available in the archive mode.

The Delete button is available in the archive mode, when an archived data is being viewed. When the Delete button is clicked, the currently viewed data will be prompted for deletion. The system will go back to the real-time mode after the data has been deleted.

Therefore, it is obvious from the description that a simple, less time consuming, more straight forward method of generating reports can be achieved without strenuous programming and debugging.

Although the above description has described the invention when used primarily with a computer monitoring system with an HTML browser, the same invention can easily be adapted for use in other types of monitoring systems and interfaces such as normal desktop application, PDA screens or cellular phone displays.

It is understood that the invention may be embodied in numerous other ways without departing from the scope of the invention.

What is claimed is:

1. A method for generating reports for a computer monitored or aided environment that comprises a server-side module, a client-side module, a live data feed, and a database, the server-side module, client-side module, live data feed, and database being interconnected, the method comprising:
creating a report layout, the report layout containing one or more dynamic fields with a manually inserted data identifier for the live data feed;
automatically associating, at the server-side, each dynamic field with the data identifier for the live data feed;
using the associated data identifier to collect information from the live data feed for each dynamic field;

storing the collected information in the database using the associated data identifier to identify the collected information;

retrieving the information from the database using the associated data identifier;

displaying, at the client-side, the information for each dynamic field on a display using the associated data identifier in the report layout; and generating the report in an archive mode or a real-time mode, wherein in the archive mode, the report includes previously stored static information from the database, and in the real-time mode, the report includes live dynamic information collected from the live data feed which has not yet been stored;

wherein the report layout and the data identifier are linked automatically and shared universally for the generation of a displayed report and a printed report.

2. The method for generating reports for a computer monitored or aided environment according to claim 1, wherein the server-side module is configured to:

parse the report layout, extract the data identifier from the dynamic field, collect the information at the live data feed using the data identifier for each dynamic field for the report, and store the information in the database with the data identifier and a time stamp according to a timer.

3. The method for generating reports for a computer monitored or aided environment according to claim 1, wherein the server-side module is configured to:

parse the report layout, extract the data identifier from the dynamic field, collect the information at the live data feed using the data identifier for each dynamic field for the report, and store the information in the database with the data identifier upon a user's command.

4. The method for generating reports for a computer monitored or aided environment according to claim 1, wherein the server-side module assigns a storage address to the information for each dynamic field using the data identifier before storing the information into the database, without the need of user interference after creating the report layout.

5. The method for generating reports for a computer monitored or aided environment according to claim 1, wherein the client-side module can be set to the archive mode or the real-time mode, which are inter-changeable automatically upon a user action of saving, opening, closing, or deleting a report.

6. The method for generating reports for a computer monitored or aided environment according to claim 4, wherein the storage address is predetermined automatically by the data identifier in the report layout.

7. The method for generating reports for a computer monitored or aided environment according to claim 6, wherein the storage address comprises a database name, a table name and a column name.

8. The method for generating reports for a computer monitored or aided environment according to claim 1, wherein the client-side module automatically inserts and displays a toolbar like graphic user interface comprising:

a save button that allows storing the displayed information in the database and setting the client-side module to the archive mode, an open button that allows retrieving and displaying the stored information and setting the client-side module to the archive mode, a close button that allows closing the display of previously stored information and setting the client-side module to the real-time mode, a delete button that allows deleting the stored information and setting the client-side module to the real-time mode, a print button that allows printing the displayed information, and an export button that allows exporting the stored information into any one of: Comma Separated Values (CSV), HTML, or XML file formats, on the display for report handling, without needing a user to manage the data identifier during run-time.

9. The method for generating reports for a computer monitored or aided environment according to claim 1, wherein the client-side module is configured to poll the collected information for each dynamic field within the database and provide the user with the option to perform any one of:

a) save a displayed report and set the client-side module to the archive mode, b) open a saved report from the database and set the client-side module to the archive mode, c) close a report on the display and set the client-side module to the real-time mode, d) view a real-time dynamic report, e) print the displayed report, f) delete a saved report from the database and set the client-side module to the real-time mode, or g) export the displayed report to any one of: Comma Separated Values (CSV), HTML, or XML file formats.

10. The method for generating reports for a computer monitored or aided environment according to claim 9, wherein a format of the printed report corresponds to a format of the displayed report.

11. A system for generating reports for a computer monitored or aided environment that comprises a server-side module, a client-side module, a live data feed, and a database, the server-side module, client-side module, live data feed, and database being interconnected, the system comprising:

a tool for creating a report layout, the report layout containing one or more dynamic fields with a manually inserted data identifier for the live data feed;

a storage device containing computer code to automatically associate each dynamic field with the data identifier for the live data feed;

a collector using the associated data identifier to collect information from the live data feed for each dynamic field;

a logger in the server-side module for storing and retrieving the collected information in the database using the associated data identifier to identify the collected information; and an interface displaying the information for each dynamic field on a display using the associated data identifier in the report layout;

wherein the server-side module is configured to generate the report in an archive mode or a real-time mode, wherein in the archive mode, the report includes previously stored static information from the database, and in the real-time mode, the report includes live dynamic information collected from the live data feed which has not yet been stored;

wherein the report layout and the data identifier are linked automatically and shared universally for the generation of a displayed report and a printed report, using a graphical user interface in the client-side module.

12. The system for generating reports for a computer monitored or aided environment according to claim 11, wherein the server-side module is configured to:
   parse the report layout,
   extract the data identifier from the dynamic field,
   collect the information at the live data feed using the data identifier for each dynamic field for the report, and
   store the information in the database with the data identifier and a time stamp according to a timer.

13. The system for generating reports for a computer monitored or aided environment according to claim 11, wherein the server-side module is configured to:
   parse the report layout,
   extract the data identifier from the dynamic field,
   collect the information at the live data feed using the data identifier for each dynamic field for the report, and
   store the information in the database with the data identifier upon a user's command.

14. The system for generating reports for a computer monitored or aided environment according to claim 11, wherein the server-side module is configured to:
   assign a storage address to the information for each dynamic field using the data identifier before storing the information into the database, without the need of user interference after creating the report layout.

15. The system for generating reports for a computer monitored or aided environment according to claim 11, wherein the client-side module can be set to an archive mode and a real-time mode, which are inter-changeable automatically upon a user action of saving, opening, closing, or deleting a report.

16. The system for generating reports for a computer monitored or aided environment according to claim 14, wherein the storage address is predetermined automatically by the data identifier in the report layout.

17. The system for generating reports for a computer monitored or aided environment according to claim 16, wherein the storage address comprises a database name, a table name, and a column name.

18. The system for generating reports for a computer monitored or aided environment according to claim 11, wherein the client-side module is configured to poll the collected information for each dynamic field within the database and provide the user with the option to perform any one of:
   a) save a displayed report and set the client-side module into the archive mode,
   b) open a saved report from the database and set the client-side module into the archive mode,
   c) close a report on the display and set the client-side module into the real-time mode,
   d) view a real-time dynamic report,
   e) print the displayed report,
   f) delete a saved report from the database and set the client-side module into the real-time mode, or
   g) export the displayed report to any one of: Comma Separated Values (CSV), HTML, or XML file formats.

* * * * *